J. R. COOPER.
FEATHERING OR COMMINUTING COPPER OR OTHER METALS.
No. 192,113. Patented June 19, 1877.
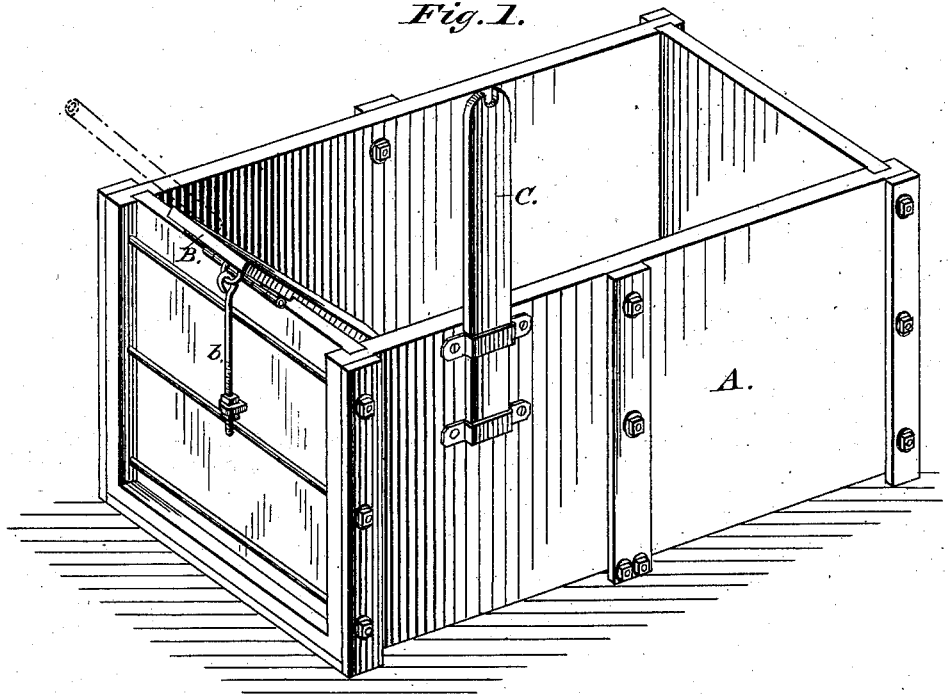
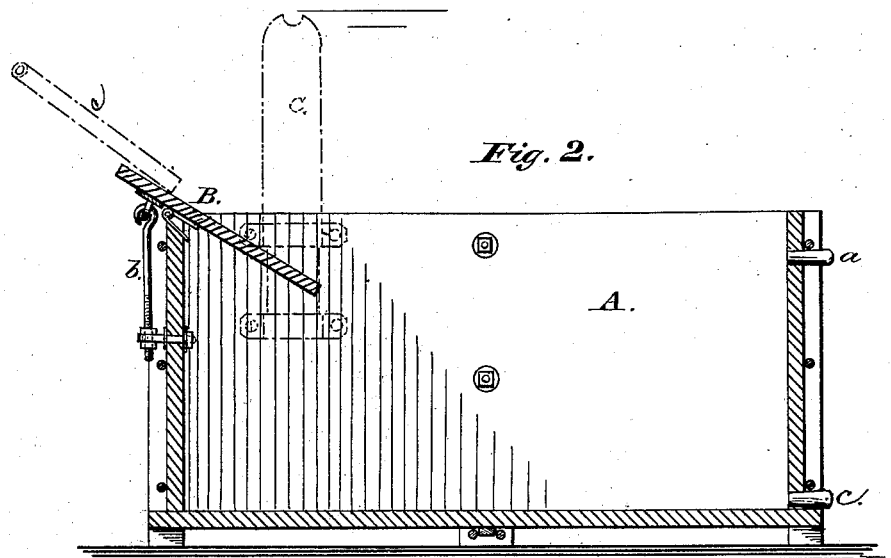

UNITED STATES PATENT OFFICE.

JAMES R. COOPER, OF FRANKLIN TOWNSHIP, OAKLAND COUNTY, MICH.

IMPROVEMENT IN FEATHERING OR COMMINUTING COPPER OR OTHER METALS.

Specification forming part of Letters Patent No. 192,113, dated June 19, 1877; application filed June 9, 1877.

*To all whom it may concern:*

Be it known that I, JAMES RENWICK COOPER, of Franklin township, in the county of Oakland and State of Michigan, have invented certain new and useful Improvements in Feathering Copper and Granulating other Metals; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to the art of making what is termed "feathered shot-copper," and for granulating metals of all kinds.

The process of making what is termed "feathered shot-copper," as heretofore practiced, is substantially as follows: An iron vessel, capable of holding one thousand pounds of molten copper, was lined with fire-clay, and the numerous small holes in the bottom of the vessel were stopped or filled with the same material. When about to be used this vessel was moderately heated and placed over a large tank filled with cold water, and provided with conveniences for renewing the same at short intervals. When all was ready the workmen filled this vessel with molten copper and opened the numerous holes in the bottom. As soon as the streams of metal were well started through the perforations in the vessel the workmen commenced ladling copper from the furnace, and poured it into the perforated vessel in order to maintain a sufficient heat to avoid the metal's chilling. The flow of water into the tank had to be large in order to prevent the resulting metal being coarse and heavy, or what is termed "bean-shot."

In this mode of making shot there was no way of varying the sizes of the shot, and consequently the same thing was produced all the time. Besides, with a furnace fitted for this kind of work, with its accompanying arrangements, it was difficult to do the ordinary work of a furnace, and quite large expenditures were necessitated where frequent changes were necessary for other classes of work.

The metal has also been feathered by the centrifugal force of a revolving disk; also, by subjecting the flowing metal to a blast of air or gas; and, further, by the force of water admitted into a cylinder from its different sides, so that when the different jets of water meet the body of water is agitated. These methods were all considered improvements in the art.

My invention has for its object the production of a feathered metal possessing a greater degree of thinness, or, in other words, more thoroughly feathered, than any that has been produced by methods heretofore practiced, and also possessing a greater fineness, both in size and color, than that heretofore produced.

I will now proceed to describe the means and method by which my invention is put in operation.

In the accompanying drawing, Figure 1 is a perspective of the tank or bosh, and Fig. 2 a section thereof.

In practice the bosh, indicated by the letter A, is three feet by three feet, on the inside, width and depth, and six feet in length, and is provided with a plate, B, two feet six inches long and twelve inches wide, which admits of adjustment by means of the threaded rod $b$ and the nuts thereon. This board or plate can be adjusted to any angle necessary to produce the size of shot that is wanted, and is placed within easy reach of the standard C, which is a rest for the workman's ladle-handle. A waste hole or outlet, $a$, is arranged so as to hold the water at a level near or within a few inches of the top of the tank, and another opening, $c$, is placed near the bottom of the tank for drawing off the water when the work is completed.

The water for use is furnished by a force-pump, and through a two-inch hose, to the tank, and for ordinary-size shot a straight two-inch pipe, $c$, is attached to the hose, through which the water passes under a pressure ranging from six to eight pounds, or thereabout.

The pipe and hose lead directly over the outer end of the board or plate B, which is inclined at an angle of about thirty degrees, and that end of the pipe which joins the hose is slightly elevated, so that the stream of water will strike the plate or board B, and become flattened at a point just above that where the metal strikes it.

The metal is brought from the furnace in a ladle holding about thirty pounds, and this is placed directly over the board B, the handle of the ladle resting in the notch of the upright standard C, when the metal is poured out of the ladle, and falls at a right angle, or nearly so, to the stream of water coming from the pipe, and strikes the water where it has a depth of from two to six inches above the inclined board, according to the size or grade of shot required.

The metal falling upon the inclined board is broken, and assumes thin irregular shapes, which are swept from the board and chilled as soon as formed, and the metal thus feathered will be found to have from about four to five times more surface for the same weight of metal than that produced by the old method, and will, in addition, be brighter in color, the method of treatment preventing, to a high degree, the oxidation which usually attends the process of feathering.

To make the finer grades of shot, I use a reduced nozzle—say something like one and a half inch nozzle—and elevate that end of the pipe next the hose slightly more than I do when making ordinary shot—and I have an increased pressure of water, say a pressure of something like fifteen to twenty pounds. The board is also at a less angle than that used for the ordinary grades.

The fineness of the metal thus feathered will be found to be of such a size that it will pass through a twenty-mesh sieve.

It is obvious that the fineness of grade of the feathered metal may be regulated by adjusting the angle of the board and hose, and by increasing or reducing the pressure of the water.

I have described the molten copper as carried to the apparatus in a ladle; but any other device which will cause the molten metal to flow in a stream and be struck by the jet of cold water as it falls may be substituted. I have also described a pump for forcing the jet of water; but a natural head of water may be used as an equivalent, and for the hose, which I prefer, any suitable jet-producing apparatus will serve the purpose.

Having described my invention, what I claim is—

1. The within-described method of feathering copper and other metals, which consists in pouring the molten metal onto an inclined plane and projecting against the metal a flattened stream of water, substantially as and for the purpose set forth.

2. The tank A, provided with the adjustable board B and standard C, substantially as described.

In testimony that I claim the foregoing as my own I affix my signature in presence of two witnesses.

JAMES R. COOPER.

Witnesses:
WILLIAM FITCH,
WM. G. HENDERSON.